Nov. 8, 1960   R. H. CUBBERLEY ET AL   2,959,495
VIBRATION DEADENING FELTS
Filed March 11, 1954
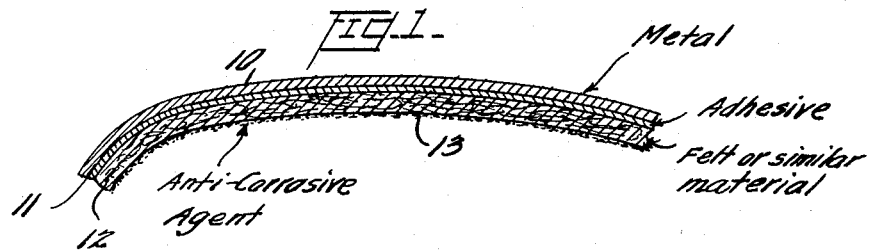
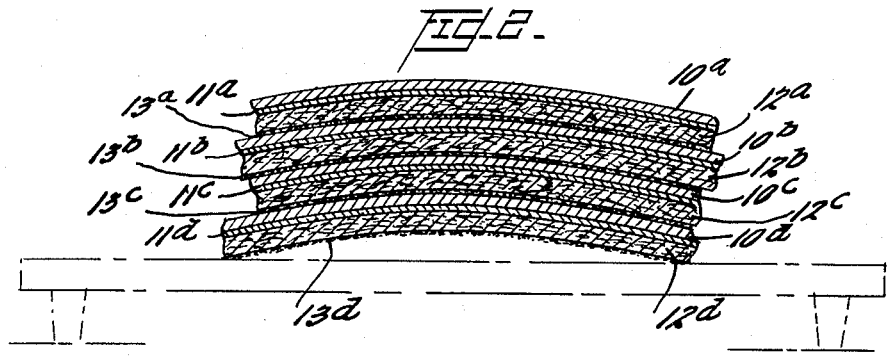
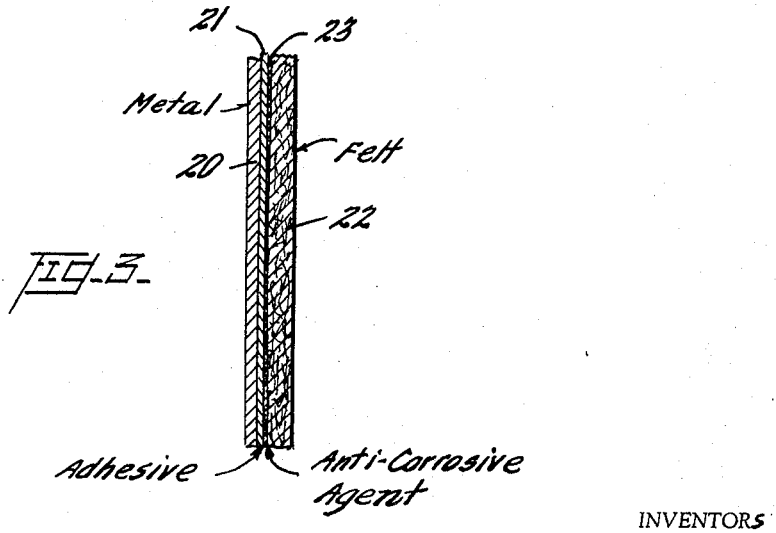
INVENTORS
Richard H. Cubberly
Wilfred H. Driesen,
BY Samuel Stearman
ATTORNEY

2,959,495

VIBRATION DEADENING FELTS

Richard H. Cubberley, Morristown, and Wilfred H. Driesen, Mountain Lakes, N.J., assignors to The Patent and Licensing Corporation, New York, N.Y., a corporation of Massachusetts Filed Mar. 11, 1954, Ser. No. 415,608

2 Claims. (Cl. 117—92)

This invention relates to sound deadening or vibration damping material, more particularly such as is suitable for use in the construction of automobile bodies and the like, wherein a vibratory metal member, such as the roof, door panels, quarter panels, truck lids, etc., is required to be combined with a layer of material capable of damping the vibration of such member.

More particularly, the invention is concerned with the problems that have been confronted in connection with the corrosion of such metallic members during the course of manufacture of automobile bodies as well as in subsequent use of the automobile.

Although the invention has been developed and possesses particular utility in dealing with such corrosion problems arising during the course of construction and use of automobile bodies, it should be understood that it is not limited thereto, and may be readily applied in connection with the same or similar corrosion problems arising during the manufacture and use of other products, such as refrigerator cabinets and the like.

Referring, however, to the matter of automobile bodies, it has long been the customary practice to attach a pad or sheet of deadening felt of appropriate size and shape, to one surface of the metal part by means of suitable adhesive material applied as a coating to one surface of the deadening felt, and installing the thus coated sheet or pad on the metal panel.

The sound deadening or vibration damping layer is formulated so as to possess the requisite physical properties to dampen or absorb the vibratory sounds of the metal part with which it is to be used. To that end, the sound deadening material generally takes the form of sheets or pads of a bibulous fibrous felt, the felt being partially, but substantially uniformly, impregnated with bituminous material for the purpose of imparting added mass and strength and other desirable properties thereto. As typical thereof, fibrous felts for this purpose may be produced in accordance with the disclosure in patent to Clarvoe, 2,008,654.

More specifically illustrative thereof is a fibrous felt which in its raw, unimpregnated state weighs, say, from 11 to 14 pounds per hundred square feet, possesses a kerosene number of approximately 250, a tensile strength of approximately 16 across the grain (one inch strip), a porosity (as measured by a Gurley Densometer) less than 11 and a caliper of approximately 0.080 inch.

Typical of bituminous material with which such a felt may be readily impregnated for the purpose aforesaid, is an asphalt having a softening point of approximately 70 (at 77° F.); a viscosity (Saybolt Furol at 210° F.) of approximately 80 seconds; penetration values (needle, 100 grams, 5 seconds) of approximately 160 at 32° F., and approximately 15 at 0° F.; and a flash point (C.O.C.) of above 500° F.

Ordinarily, in most instances, the fibrous felt of the type above-illustrated, is partially but uniformly impregnated with bituminous material such as typified by the one above-described, to a degree such that the bituminous component will constitute approximately 20% to 60% by weight of the impregnated felt. In any case, the thus treated felt, in order to serve efficiently as a damping material for vibratory metal members, such as the roof or door panels of an automobile body, should exhibit a stiffness (as measured by the Olsen Tester at 75° F. at 0.15 pound added weight) of less than 65 with the grain of the felt, and less than 35 across the grain; a tensile strength (two inch strip) greater than 20 with the grain and at least 10 across the grain; a porosity (measured by the Gurley Densometer) less than 12; a caliper (measured by the Randall Stickney gauge with one pound added and one inch diameter circular foot) of approximately 0.090 inch; and a cold flexibility sufficient to withstand bending around a 1½ inch mandrel at 0° F. without delamination or cracking.

In some instances, the fibrous felt may be embossed or waffled to form the same with spaced cavities or indentations, as for example, in the patent to Upson, 2,142,463, for the purpose of increasing its effectiveness as a sound deadening material.

Likewise, in certain instances, the deadening material may take the form of a composite of two layers of fibrous felt adhered to one another by suitable adhesive, each of the layers being preferably saturated with asphalt or the like as above-described. In such instances, one or both of such layers may be of the embossed or waffled form.

Bearing in mind the various forms of fibrous felt sheets that may be employed, and the relatively wide variations there may be in the fibrous felts and in the bituminous materials with which they may be impregnated for imparting adequate mass and strength to render them suitable for use as vibration damping or sound deadening material, the term "deadening felt" herein is intended to mean and embrace any of the varieties of bibulous, fibrous felts above-mentioned, as well as other more or less porous material, in the form of webs, sheets, blocks, pads or the like, possessing physical characteristics, such as typified by those above-enumerated, rendering them capable of deadening sound or damping vibration when applied to relatively thin or vibratory sheets or panels of metal such as those employed in the construction of automobile bodies or other vehicles and the like.

In the use of such deadening felts in the construction of automobiles, the felt is best secured to a surface of the metallic member by adhesive material, desirably throughout the area of the confronting faces of the felt and the metallic member.

The adhesives most commonly used for this purpose are of the nature of aqueous dispersions of bituminous material, rubber, resin, and the like, and aqueous dispersions of suitable combinations of these, and suitable mixtures of such dispersions.

In the use of these materials for adhering fibrous felt of the character referred to herein, to a surface of a metallic member, it is necessary that the bonding material be of such a character that it may readily be applied to the fibrous felt; that it readily adhere the latter to the surface of the metal part when the two are brought into contact; that it retain an adequate bond therebetween during the subsequent handling of the laminated assembly while the layer of the bonding adhesive is still incompletely set; and that, moreover, when the assembly is subjected to heat, such as prevails in the baking ovens through which the assembly is later passed, for the purpose of baking a paint or enamel applied to the outer surfaces of the metal part, the film of the adhesive will not thereby be deleteriously or unfavorably affected.

Suitable aqueous dispersions of adhesive material which have been widely used for laminating such deadening felts to metal parts of automobile bodies are exemplified in the patent to Groskopf, 2,180,305.

Owing to practices adopted in recent years in the construction of automobile bodies, it has become necessary that the laminated assemblies of the metal parts of the body and the deadening felt attached thereto be produced at a central point, from which they are then transported to other locations for final assembly and construction of the automobile body. Accordingly, the laminated assemblies, as for example the roof sections of automobiles, may be nested over one another in skids or the like for shipment, as by rail, to the ultimate point of assembly and construction of the automobile body.

As a result, there has arisen a very serious problem of corrosion which develops on the exposed surface of the metallic parts of the laminated assemblies during the period elapsing between the stacking or nesting of these assemblies for shipment, and their removal from the nests or piles for subsequent treatment in the body construction plant.

The deadening felts, as explained above, are in many cases laminated to the metallic member by a bonding material in the form of an aqueous dispersion. These dispersions must, in actual practice, be so formulated as to hold the deadening felt to the surface of the metal to which it is applied even while retaining a large proportion, often as high as 90%, of their original aqueous content. Moreover, since the laminated assemblies must be nested for shipment while the adhesive layer still contains such large proportions of its original water content, water must escape from the adhesive layer in the form of moisture vapor through the relatively porous deadening felt in the subsequent drying out of the adhesive. Since each layer of deadening felt may be in direct contact with the exposed metal surface of an adjacent laminated assembly in the nest or pile, corrosion of such exposed metal surface of the adjacent assembly readily takes place during the time elapsing before the assemblies are removed from their nested positions for subsequent treatment. In actual practice, this corrosion requires costly additional handling and treatment of the assemblies in order properly to condition them for such subsequent treatment as bonderizing and application of paint or enamel thereto.

Where the adhesive employed for bonding the deadening felt to the metal member is not in the form of an aqueous dispersion or other water-containing system, corrosion frequently occurs on the exposed metal surface of the laminated assemblies when thus nested for shipment, by reason of atmospheric moisture absorbed by the deadening felt during storage and transit of the assemblies. In this instance also, any such corrosion as occurs makes it necessary to treat the corroded surface, as by sanding or grinding, in order to present a clean metal surface for the subsequent necessary bonderizing and enameling operations.

In addition to the corrosion problem which has thus arisen by reason of the necessity for the laminated assemblies to be nested one upon another for shipment to distant points before final assembly of the automobile body, this nesting of the laminated parts frequently results in sticking of the outer surface of the deadening felt to the surface of the adjacent laminated assembly in the nest or pile. Apparently, this sticking stems from the presence of films of oil upon the exposed surface of the metal layer of the adjacent assembly, in sufficient quantity to exert a solvent action upon the asphalt with which the felt is impregnated in the course of its manufacture. At any rate, when the laminated assemblies are separated from their nested positions, some of the felt layer sticks to the metal of the adjacent assembly. This is highly objectionable not only because it diminishes the thickness of the felt layer to that extent, but also because the fiber thus remaining attached to the exposed surface of the metal part must also be cleaned off before the laminated assembly can be subjected to the necessary subsequent treatments as above set forth.

The principal object of the invention, accordingly, is to provide improvements in deadening felts whereby to eliminate the occurrence of corrosion when these felts are laminated to one surface of a metal part and the laminated assemblies are nested or stacked in piles in which the exposed metal surface of each assembly is in direct contact with the exposed surface of the felt adhered to the opposite surface of the adjacent assembly in the nest or stack.

Another object is to provide an improved deadening felt for elimination of corrosion under the conditions described, especially in those instances where the felt is laminated to the metal part by an adhesive in the form of an aqueous dispersion.

Another object of the invention is to provide improvements in deadening felts which may be employed as aforesaid, without giving rise to the occurrence of corrosion from the causes above referred to, and which at the same time will serve to prevent the occurrence of sticking between the exposed surface of the felt layer and the exposed metal surface of an adjacent laminated assembly in a nested stack or pile of such assemblies.

Still a further object of the invention is to provide an improved form of deadening felt characterized by the features and advantages above set forth and which may readily be manufactured without materially altering the normal procedure commercially employed in the manufacture of deadening felts.

Aside from the corrosion that occurs from causes arising in the practices in the automotive trade in the manufacture of automobile bodies wherein deadening felts are applied to vibratory metal parts as above-described, serious corrosion also frequently occurs in certain parts of automobile bodies, such as doors and trunk lids thus constructed, owing to leakage of rain water which gains access to areas where the deadening felt is in contact with the metal part. If the film or layer of adhesive present between the deadening felt and the metal part is present in adequate amount this itself serves to protect the metal from corrosion by any such leakage of water, because the bonding film is impermeable to water vapor. However, the speeds at which commercial practice demands that the deadenings felts be laminated to the metal parts, frequently results in failure by the operators to apply the laminating adhesive in an amount adequate to provide a water-impermeable film between the felt and the metal. Accordingly, since the surfaces to which the deadening felt is applied do not receive any bonderizing treatment, leakage of rain water which gains access to areas between the deadening felt and the metal surfaces not protected from corrosion by an adequate film of the adhesive, causes objectionable corrosion of those surfaces during the use of the automobile.

Accordingly, still another object of the invention is to provide improvements in sound deadening felts, whereby to eliminate or reduce the corrosion of door panels, trunk lids, etc., of automobiles caused by the lack of an adequate film of vapor-impermeable adhesive between the surface of the metal and the deadening felt.

Broadly speaking, the objects and advantages of the invention may be accomplished by depositing a corrosion inhibiting substance on one or both surfaces of the deadening felt in the course of its manufacture, in an amount which will be adequate to prevent corrosion of metal otherwise occurring in assemblies of the felt as above set forth.

We have found that such a deposit of the corrosion inhibiting substance on the surface of the deadening felt opposite that which is to be adhered to the surface of the metal part in making a laminated assembly thereof serves, when a number of such assemblies are arranged one on top of another in a nested stack, to prevent corrosion of the outer surface of the metal part of the adjacent assembly in contact therewith in the nested stack.

Likewise, we have found that such a deposit of the corrosion inhibiting substance on the surface of the deadening felt which is to be adhered to the surface of the metal part in making a laminated assembly of the two, serves to prevent corrosion of the metal part in the event an adequate amount of adhesive has been applied in the laminating operation.

In the accompanying drawing:

Fig. 1 is a fragmentary view, in enlarged cross-section, illustrating the invention as applied to a laminated automobile roof and deadening felt assembly;

Fig. 2 is a similar view showing a number of such assemblies arranged in a nested stack thereof; and Fig. 3 is a fragmentary view, in enlarged cross-section, illustrating the invention as applied to an automobile door panel or the like, for preventing corrosion by reason of leakage of water in between the deadening felt layer and the surface of the metal panel to which it is adhered.

The corrosion inhibiting substances preferably employed in accordance with our invention are water-soluble substances. An important advantage accruing from the use of water-soluble substances as the corrosion inhibiting agent is that in the saturation of the felt with the asphalt employed the felted web must necessarily be passed through a migrating oven at approximately 300° F. to cause the saturant to spread uniformly over the felt fibers.

Accordingly, it becomes necessary to cool the saturated felt before it can be formed into rolls for shipment. Such cooling of the felt is most conveniently accomplished by applying to the surfaces thereof a mist or spray of water at a rate such that the applied water becomes evaporated by the latent heat of the hot web, thereby rapidly reducing its temperature to the necessary degree. By employing corrosion inhibiting substances that are sufficiently water-soluble to be dissolved in adequate concentrations in the water employed for cooling the hot felted web in the manner aforesaid, a dry deposit of the corrosion inhibitor can be formed on the surface of the felt in a sufficient quantity to serve effectively for performing the corrosion inhibiting purposes herein described, without any material cost over and above the cost of the corrosion inhibiting substance itself. With this in view, the corrosion inhibiting substance employed is preferably a substance soluble in water to the extent of at least thirty percent by weight of the solution.

More specifically, in accordance with our invention, the corrosion inhibiting substances that may be employed are selected from those which will serve adequately for the prevention of corrosion under the conditions described, when present as dry deposits on the surface of the deadening felt in amounts which may vary from about 0.3 gram to about 4 grams per square foot of surface area.

There are available on the market a great number of variously constituted substances known to function as inhibitors of corrosion of ferrous metals. Although we found that certain ones of these are not as effective for our purposes as others, and that indeed some of them give evidence of more severe corrosion of the metal when used as herein contemplated than if no corrosion inhibitor at all is employed, we have been able to achieve the objects of the invention with any one of quite a number of known corrosion inhibiting substances.

For the purpose of evaluating the effectiveness of the various inhibitors to be used according to the invention, we employ tests which are more or less standard for such materials. Speaking more in detail of the test procedure employed, the inhibitor under test is applied to one face of the deadening felt by brushing a known weight thereof from a water solution or other solvent (in those instances where the inhibitor is not water-soluble). The water or solvent is allowed to evaporate at room temperature. Where the test is for the purpose of determining the severity of corrosion that may occur when the felt is laminated to one surface of a metallic member, and the exposed opposite surface of the felt is to be in contact with the exposed surface of the metallic member of another such assembly in a nested stack thereof, the inhibitor treated test specimen is applied to a steel panel and adhered thereto by a suitable water dispersion of adhesive material, such as is normally used in automotive plants, the adhesive being applied to the untreated side of the felt. The specimens are then stacked, without allowing the adhesive to dry, and with the exposed surfaces of the steel in contact with the inhibitor treated face of the felt on the adjacent specimen, on a support inside a metal container. The container is filled to a one-inch depth of water, sealed and placed in an oven at 100° to 110° F. When control specimens, having no inhibitor applied to the felt, tested under the same conditions, exhibit moderate corrosion, which usually occurs in about one week, the test is stopped and the panels under test are examined.

In those instances where the effectiveness of the inhibitor is to be evaluated for its ability to prevent corrosion by rain water leaking in behind doors or trunk lids of automobiles, as frequently occurs, and gaining access to areas of the interface between metal and deadening felt which lack an adequate amount of adhesive to constitute a water-impermeable film therebetween, the inhibitor treated side of the test specimen of felt is adhered to a surface of the steel test panel. The adhesive, in this instance, is applied only around the circumference or border of the steel test panel, leaving the center bare in order to simulate the condition which occurs when deadening felts are laminated to metal parts of automotive bodies without adequate amounts of the adhesive, as frequently occurs in automotive body construction. These test specimens are then allowed to dry at room temperatures for 24 hours, then immersed in water at 160° F. for 20 minutes, followed by baking for one-half hour at 300° F., and then for one hour at 350° F. This treatment simulates the conditions existing during the bonderizing and enamel-baking stages in actual practice in automobile body construction plants. The test specimens are then exposed to a water mist in a standard salt-spray apparatus for 48 to 96 hours, during which time moderate corrosion occurs on the control test specimens having no inhibitor applied to the adhered surface of the felt layer. The surface of the steel under the felt in the specimens under test is examined by cutting away the felt.

On the basis of these tests and other considerations in actual practice of the invention already referred to above, we consider sodium benzoate as perhaps the preferred material that may be employed for achieving the objects of the invention. We have found sodium benzoate to be highly effective in preventing corrosion under the conditions stated when employed in relative small amounts. Moreover, it is relatively low in cost and by reason of its water-solubility it may readily be applied to the surfaces of the deadening felt in adequate quantities of a water solution thereof, and hence in concentrations sufficiently high to leave a dry deposit of adequate amount of the salt when employed in solution in sprays of water normally applied for cooling the dry felt at a convenient point after discharge from the customary migrating ovens used in the manufacture of the deadening felt.

Sodium benzoate may accordingly be employed by placing it in water solution in desired concentration, say twenty percent by weight, and utilizing this solution for spraying the hot, asphalt-impregnated felt as it comes from the migrating ovens in order to cool the felt and thereby concomitantly form on the sprayed surface a dry deposit of the benzoate when the water has become evaporated by the latent heat of the felt. Depending upon the concentration of the benzoate in the spray water and the rate at which the surface of the sheet is sprayed therewith, the amount of the benzoate thus deposited on the felt may be readily controlled.

We find that sodium benzoate deposited in an amount as low as 1.5 grams thereof per square foot of felt is sufficient to preclude the occurrence of corrosion when subjected to comparative tests under the conditions above-described. The use of sodium benzoate in this manner in actual practice has likewise demonstrated its effectiveness not only in preventing corrosion of the metal parts during the handling and use of the assemblies as above-described, but also in preventing the sticking of the felt layer of one assembly to the surface of the metal layer of an adjacent assembly when a number of such assemblies is arranged in a nested stack. It will be apparent, of course, that the above-mentioned amount of 1.5 grams sodium benzoate per square foot of felt is merely illustrative, and may be varied considerably, depending upon particular conditions prevailing. In general it may be said that amounts varying from approximately 1.0 to 4.0 grams per square foot of this sodium benzoate may be employed.

Sodium nitrite has been found likewise to be effective when used in water solution in this manner, to deposit this salt on the surface of the felt in an amount of about 2.5 grams per square foot.

Another substance which may be employed in the practice of the invention is dicyclohexylammonium nitrite. This is understood by us to be the composition of a product furnished by Shell Chemical Company under the trade designation VPI 260. Although this material is apparently one of a variety of such organic compounds which have in recent years been developed as agents which function as corrosion inhibitors in the vapor phase, the effectiveness of the corrosion inhibitors which may be employed in the practice of our invention does not appear to depend upon their vapor-pressure characteristics. On the contrary, the evidence available on the basis of the work we have thus far done in the development of our invention indicates that inhibition of corrosion in the laminated assemblies of metal parts and deadening felts with which we are concerned, occurs by reason of the direct contact of the inhibiting agent and the metallic surface, although it may be entrained by moisture vapor for very short distances when strip separators are employed between adjacent assemblies in the stack.

With respect to dicyclohexylammonium nitrite, we find that a dry deposit thereof on the surface of the belt, in an amount of from 0.3 to 0.8 gram per square foot of felt, is effective for inhibiting corrosion of the metal surface with which it is in contact. Less than 0.3 gram of this compound does not appear to be effective for the purpose.

Still other inhibiting agents which may be used are those available from Enthone Inc., under the trade designation NR 28 and NR 31. The chemical constitution of neither of these two materials is known to us at present. However, we have found that when subjected to the test conditions hereinabove set forth, one gram per square foot of NR 28 is sufficient to inhibit corrosion of the steel test panel. Likewise the NR 31, when employed in an amount of approximately 2.7 grams per square foot of felt is sufficient to inhibit corrosion under the stated conditions.

In the following tabulation there are set forth the results obtained by the above-described tests upon felt treated with the treating agents above-mentioned, as well as a number of others, in comparison to a control specimen wherein the felt was not treated with any corrosion inhibiting agent and which exhibited severe corrosion under the conditions of the test:

| Inhibiting Agent | Composition | Results |
| --- | --- | --- |
| Commercial grade | Sodium benzoate | No corrosion at 1.5 gm./ft.$^2$ |
| Shell Chemical Co. "VPI 260". | Dicyclohexylammonium nitrite. | No corrosion at 0.3 gm. per ft.$^2$ Lesser quantities not effective. |
| Commercial grade | Sodium nitrite | No corrosion at 2.7 gm./ft.$^2$ |
| Enthone Inc. "NR 28". | Unknown | No corrosion at 1.0 gm./ft.$^2$ |
| Enthone Inc. "NR 31". | ----do---- | No corrosion at 2.7 gm./ft.$^2$ |
| Allied Chemical & Dye "Nitrox". | Mixture of caustic soda and sodium nitrite. | Slight protection at 3.0 gm./ft.$^2$ |
| Commercial grade | Morpholine | Slight protection at 1.5 gm./ft.$^2$ |
| "TEA 728" | Triethanolamine phosphate. | Slight improvement at 3.0 gm./ft.$^2$ |
|  | Diethylthiourea | Worse than control at 3.5 gm./ft.$^2$ |
|  | Dibutylthiourea | Worse than control at 2¾ gm./ft.$^2$ |
|  | Rosin amine D | Worse than control at 6 gm./ft.$^2$ |
|  | Rosin amine D acetate | Do. |

It will be seen from the foregoing tabulation that such known corrosion inhibiting substances as diethylthiourea, dibutylthiourea, rosin amine D, and rosin amine D acetate, function actually to aggravate corrosion when employed in the quantities indicated and in the relationship contemplated by our invention. Just what the explanation may be for this effect, we have been unable as yet to determine. But, considering that some normally effective corrosion-inhibiting agents function indifferently or actually to aggravate the corrosion under the conditions of use contemplated by our invention, it may be that in at least certain of these instances their effectiveness would be realized by employing them in quantities materially different than those indicated in the above tabulation. On the other hand, considering that sodium benzoate as well as the quite different chemical substance dicyclohexylammonium nitrite, function effectively in quantities of 1.5 grams and 0.3 gram, respectively, per square foot of felt, and morpholine for example affords some protection at 1.5 grams per square foot, whereas substances such as diethylthiourea appear to aggravate the corrosion tendency, the difference may be accounted for by some unexplained effect upon the latter agents by components of the felt or of the adhesive employed for laminating the same to the metal under the conditions of use. On the basis of this postulate it appears logical to conclude that no such deleterious reaction takes place in the case of agents such as those indicated in the above tabulation to be effective.

Since the adhesives, especially the water-dispersed adhesives, employed for laminating the felt to the metal parts are usually composed of a number of ingredients combined into a somewhat complex colloidal system, the corrosion inhibiting agents employed in the practice of the invention should, at any rate, be selected from among those which have no deleterious effect upon the adhesive employed for laminating the felt to the metal. No such deleterious effects, so far as we have been able to observe, have been encountered in the case of the inhibitors mentioned above.

As pointed out above, sodium benzoate and sodium nitrite are presently considered to be the preferred inhibiting agents which may be employed in the practice of the invention. Both of these are relatively low in cost, and being readily soluble in water lend themselves to easy application in the manner above set forth. Moreover, they serve also to prevent sticking of the treated felt to the oily metal surface of an adjacent laminated assembly when arranged in nested stacks thereof.

In Fig. 1 of the drawings, there is illustrated a fragmentary portion of a laminated assembly for an automobile roof, utilizing deadening felt made in accordance with the invention. In this figure, numeral 10 indicates the metal layer of the roof. The deadening felt, indicated at 12, is laminated to the under side of the roof by a film of adhesive, indicated at 11, preferably in the form of an aqueous dispersion such as referred to above, the opposite surface of the felt carrying the dry deposit, indicated in greatly exaggerated form by the numeral 13, consisting of the corrosion inhibiting substance.

In Fig. 2 there is illustrated a portion of a nested stack of several laminated assemblies such as those shown in Fig. 1. Here the metal members of the several assemblies are indicated at 10a, 10b, 10c and 10d; the respective films of laminating adhesive are indicated at 11a, 11b, 11c and 11d; the respectively adhered layers of deadening felt are indicated at 12a, 12b, 12c and 12d; and the respective deposits of the corrosion inhibiting substance on the opposite faces of the latter are indicated at 13a, 13b, 13c and 13d. As will be seen, the deposits of the corrosion inhibiting substance on the outer surface of the felt layers of the several assemblies are disposed in direct contact with the exposed surface of the adjacent metal member in the stack. As fully explained above, by reason of the presence of such deposit of the corrosion inhibiting substance on the outer surface of the layers of deadening felt, corrosion of the surface of the metal member in contact therewith may be effectively prevented during any relatively long period of storage and transportation of the stack of assemblies thus arranged.

In Fig. 3, there is illustrated a portion of an automobile door, wherein the numeral 20 indicates the metal door panel. In this instance, the deadening felt, indicated at 22 and treated as above-described to deposit the corrosion inhibiting substance shown (in greatly exaggerated form) at 23 on a surface thereof is laminated to the metal panel 20 by a film of adhesive, indicated at 21, applied over the thus treated surface.

It will be apparent from the foregoing, that in certain instances it may be desirable to apply the corrosion inhibiting substance to both surfaces of the deadening felt, in order that after the felt has been laminated to the metallic member, the corrosion inhibiting substance will be exposed on the surface of the felt layer which will be in contact with another corrodible metal surface during storage and shipment, as well as present on the surface of the felt which is adhered to a metal member for preventing corrosion of the latter which may arise from lack of an adequate film of the laminating adhesive.

Where the corrosion inhibiting substance is applied to only one of the surfaces of the felt during the course of its manufacture, it may be desirable to indicate, in any convenient fashion, which one of the two surfaces is the treated surface, as for example, by applying visible stripes or other indicia to the untreated surface.

Although the invention has been described and illustrated with reference particularly to its embodiment in deadening felts, it is to be understood that the particular illustrations herein given are merely exemplary of the invention and its application in this particular field of use. It should be apparent that the invention may be embodied in sheets or webs of fibrous felt that do not, or are not intended to, serve a sound-deadening or vibration damping function, but which are intended to be laminated to a surface of a metal member which may normally become subjected to corrosion during manufacture, handling, shipment or use thereof. It will be understood, therefore, that the specific examples cited are not intended to limit the scope of the invention, and that on the contrary, the purposes and advantages of the invention may be realized by those skilled in the art in other fields of use and by adopting various modifications of the specific embodiments illustrated and described.

Having described our invention, what we claim is:

1. A vibration damping material consisting of a flexible sheet of bibulous fibrous felt uniformly impregnated with bituminous material in an amount of from about 20% to 60% by weight of the impregnated felt, said felt having on one surface thereof the dried deposit of an aqueous solution of sodium benzoate in an amount to inhibit corrosion of metal surfaces which normally become corroded when in contact with said first-named surface for a substantial period of time in the presence of moisture vapor.

2. A vibration damping material consisting essentially of a flexible sheet of bibulous fibrous felt uniformly impregnated with bituminous material in an amount of from about 20% to 60% by weight of the impregnated felt, said felt having on one surface thereof the dried deposit of an aqueous solution of sodium nitrite in an amount to inhibit corrosion of metal surfaces which normally become corroded when in contact with said first-named surface for a substantial period of time in the presence of moisture vapor.

References Cited in the file of this patent

UNITED STATES PATENTS

| Number | Name | Date |
|---|---|---|
| 1,421,338 | Young | June 27, 1922 |
| 1,610,959 | Lines | Dec. 14, 1926 |
| 2,139,882 | Cunnington | Dec. 13, 1938 |
| 2,184,139 | Cunnington | Dec. 19, 1939 |
| 2,237,745 | Musgrave | Apr. 8, 1941 |
| 2,249,800 | Weber | July 22, 1941 |
| 2,472,100 | Fair | June 7, 1949 |

OTHER REFERENCES

Jour. Soc. of Chem. Industry for May 1947, pp. 138–142.

UNITED STATES PATENT OFFICE
CERTIFICATE OF CORRECTION

Patent No. 2,959,495                November 8, 1960

Richard H. Cubberley et al.

It is hereby certified that error appears in the printed specification of the above numbered patent requiring correction and that the said Letters Patent should read as corrected below.

Column 1, line 19, for "truck" read -- trunk --; column 2, line 7, after "with" insert -- a --; column 5, line 20, for "adequate" read -- inadequate --; line 38, after "employed" insert a comma; column 6, line 71, for "of", second occurrence, read -- in --; column 7, line 58, for "belt" read -- felt --.

Signed and sealed this 25th day of April 1961.

(SEAL)
Attest:

ERNEST W. SWIDER
Attesting Officer

DAVID L. LADD
Commissioner of Patents